June 22, 1943.  C. A. KURZ  2,322,241
FISHING FLOAT
Filed March 24, 1941

Inventor
Christian A. Kurz
By F. L. Walker
Attorney

Patented June 22, 1943

2,322,241

UNITED STATES PATENT OFFICE 2,322,241

FISHING FLOAT

Christian A. Kurz, Dayton, Ohio

Application March 24, 1941, Serial No. 384,843

10 Claims. (Cl. 43—49)

This invention pertains to fishing floats and more particularly to attachment means and an improved method of engaging a fishing line therewith in such relation that the float is easily and readily adjustable longitudinally of the line, but is securely held in its adjusted relation.

The particular fishing float in association with which the present invention is illustrated, comprises a double tapered hollow body, preferably formed with longitudinally disposed radially projecting fins.

Such fishing float, per se, forms no part of the present invention, which relates to interlocking the fishing line with the float by engaging it in reversely disposed marginal notches in the fins adjacent each end of the float and spirally wrapping the line about the float body intermediate such points of engagement.

The object of the invention is to provide a simple but efficient means for adjustably engaging a fishing line with a float for to and fro adjustment along the line, but which will hold the float securely in its adjusted position.

A further object of the invention is to provide engaging means with which the line may be easily and quickly engaged and disengaged.

A further object of the invention is to provide line attaching means which will enable the float to be readily adjusted along the line and secured without the necessity of detaching the line therefrom.

A further important feature of the invention is the herein disclosed method of engaging the line with the float to automatically lock the float by pulling strain on the line.

A further object of the invention is to provide a line attaching means for fishing floats possessing the advantageous structural features and inherent meritorious characteristics herein mentioned.

With the above primary and other incidental objects in view as will more fully appear in the specification, the invention intended to be protected by Letters Patent consists of the features of construction, the parts and combinations thereof, and the mode of operation, or their equivalents, as hereinafter described or illustrated in the accompanying drawing.

Referring to the drawing wherein is illustrated the preferred, but obviously not necessarily the only form of embodiment of the invention, Fig. 1 is a perspective view of a fishing float embodying the present invention.

Like parts are indicated by like characters of reference throughout the several views.

Figures 1, 2, 3:
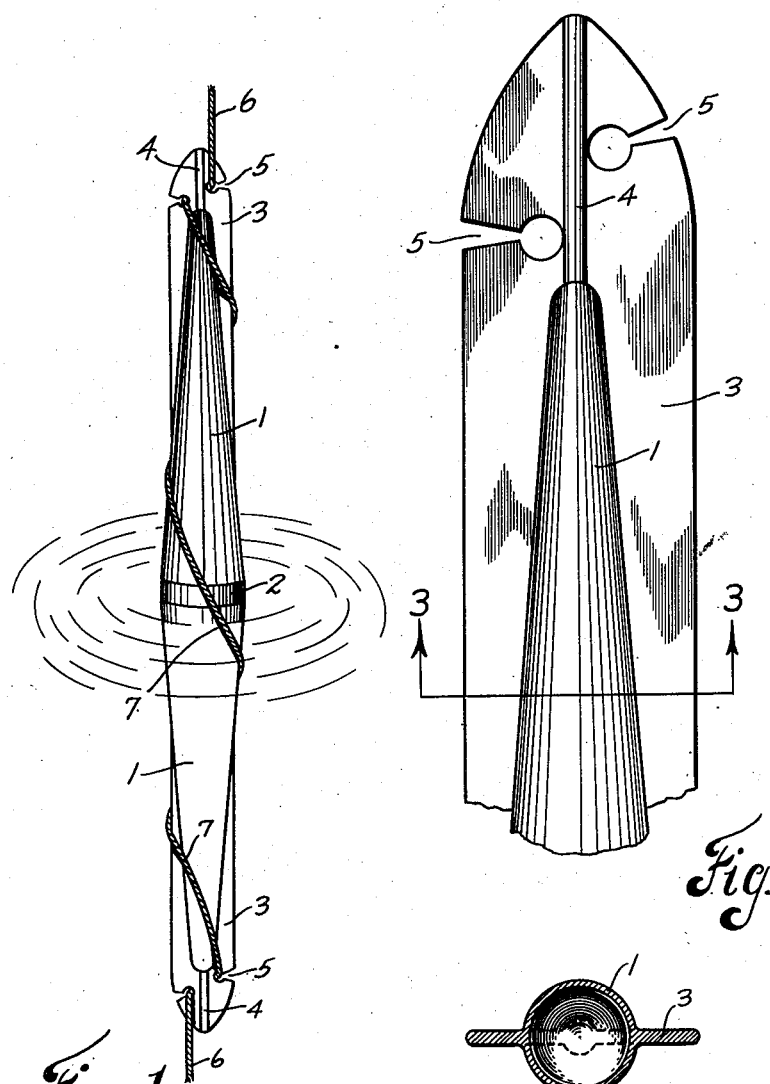
Fig. 2 is an enlarged detail side elevation of a terminal portion of the float.
Fig. 3 is a transverse sectional view on line 3—3 of Fig. 2.

The particular float illustrated in Fig. 1 of the drawing, comprises two elongated hollow cones 1—1 which are preferably, although not necessarily, formed from initially plastic molding material. The hollow cones 1 are assembled in end to end axial alignment with their base terminals connected one to the other. A coupling member 2 is preferably interposed between the cones, although the latter may be directly connected to each other without such interposed coupling device.

Each of the hollow cones 1 is formed with longitudinal oppositely extending radial fins 3—3, disposed in a common diametrical plane. Such fins serve to steady the float in the water and minimize rotation and retard drift. The terminals of the fins are reinforced beyond the apices of the cones by registering ribs 4 on opposite sides thereof.

The fins at each terminal of the float are provided with reversely arranged key hole notches 5 which intersect the margins of the fins. These notches are not only reversely disposed, but they are preferably longitudinally offset or staggered.

The intersection portions of the notches 5 are outwardly flaring and communicate with the eyes of such slots through restricted throats.

This enables easy engagement of the line 6 within the orifices of the notches but necessitates forcing the line past the throat into the eye of the notch.

To engage the float with the line 6 for longitudinal adjustment thereon, the line is engaged in first one and then the other of the notches 5 in the fins 3 at one end of the float. It is then given a couple of turns 7 about the reversely tapered middle of the float, thereafter, it is engaged as before in the oppositely turned notches 5 in the fins at the other end thereof. The enlarged eye and narrow communicating throat of the notch effectively resists accidental disengagement of of the line from the eye of the notch, although it is easily passed thereinto.

When so engaged, any attempt to pull the line 5 in either direction past the float, or conversely to slide the float in either direction on the line, merely causes a decided tightening of the turns 7 of line about the body of the float and within the notches. However, by taking hold of a turn 7 of the line, it may be very easily pulled from either end of the float through the eyes of the notches. So long as slack is maintained in the turns 7, the float may be slidingly adjusted in either direction, or surplus line may be pulled from one end toward the middle of the float, thus extending the slack of the turns, and then it may be pulled from the opposite end away from the float. However, when all the slack has been taken out of the turns 7 the line binds upon the float so as to resist strongly any further relative adjustment.

The present invention pertains to the manner of securing the line to the float, including the provision of the key hole slots 5 in intersecting relation with the margins of the fins. The particular construction of the float, per se, forms the subject matter of a separate concurrent application, Serial No. 402,604, filed July 16, 1941.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute, the invention has been described in language more or less specific as to structural features, it is to be understood that the invention is not limited to the specific features shown, but that the means and construction herein disclosed comprise the preferred form of several modes of putting the invention into effect, and the invention is therefore claimed in any of its forms or modifications within the legitimate and valid scope of the appended claims.

Having thus described my invention, I claim:

1. A fishing float, including terminal flat fins, reversely arranged key hole notches in the fins intersecting the margins thereof having flaring entrance orifices for the line and restricted throats communicating with the eyes of such key hole slots in which a fishing line is successively engageable and between which the line extends through at least one turn about the float.

2. The combination with a doubly tapered fishing float having longitudinal radially extending fins, of pairs of reversely disposed key hole notches in the fins at each end of the float intersecting the margins of the fins for engagement therein of a fishing line.

3. A fishing float, longitudinal radially extending fins thereon and marginal notches in the fins adjacent opposite ends of the float for engagement of a fishing line therein.

4. A fishing float, longitudinal radially extending fins carried thereby and key hole shaped notches in the fins at opposite ends of the float for engagement of a fishing line therein.

5. As an article of manufacture, one of a pair of detachably interengageable members comprising a body of molded plastic material including a relatively thin flat marginal portion having a key hole slot therein intersecting the edge thereof including a flaring entrance orifice and a restricted throat communicating with the eye of said key hole slot through which the companion member of the detachably interengageable pair may be introduced.

6. A fishing float or the like, including a body portion, thin, flat, longitudinal fins upon the body portion in an axial plane thereof and a pair of reversely disposed key hole slots intersecting the oppositely disposed margins of the fins for double engagement therewith of a fish line.

7. A fishing float or the like, including an elongated body portion, and thin, flat, longitudinally disposed fins upon the body portion in an axial plane thereof and terminally extending beyond the ends of the body portion, and means enabling the engagement of a fishing line with the float.

8. A fishing float, including an elongated buoyant body and flat terminal extensions thereon having reversely directed marginal notches thereon at each end of the elongated buoyant body.

9. A fishing float, including a buoyant body and integral rigid, flat fins disposed in radial relation with the axis of the buoyant body, the fins having marginal notches therein for connecting a line to the float.

10. A fishing float including an elongated buoyant body, integral rigid, flat fins extending beyond the terminals of the buoyant body, having reversely disposed key hole shaped notches intersecting the margins of the fins at opposite ends of the buoyant body.

CHRISTIAN A. KURZ.